June 27, 1939.  L. E. LA BRIE  2,163,884

BRAKE

Filed July 6, 1936  5 Sheets-Sheet 1

INVENTOR.
LUDGER E. LA BRIE
BY
J. P. Keiper
ATTORNEY

June 27, 1939.   L. E. LA BRIE   2,163,884
BRAKE
Filed July 6, 1936   5 Sheets-Sheet 2

INVENTOR.
LUDGER E. LABRIE
BY
*F. P. Keiper*
ATTORNEY

June 27, 1939.  L. E. LA BRIE  2,163,884
BRAKE
Filed July 6, 1936   5 Sheets-Sheet 4

INVENTOR.
LUDGER E. LA BRIE
BY  J. P. Keiper
ATTORNEY

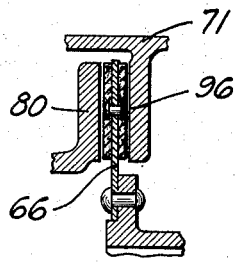
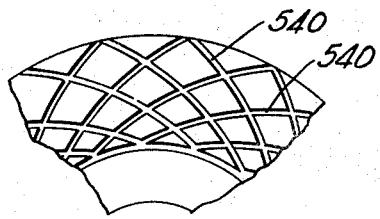
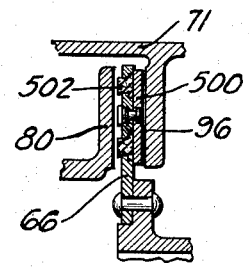
FIG.16  FIG.23  FIG.17
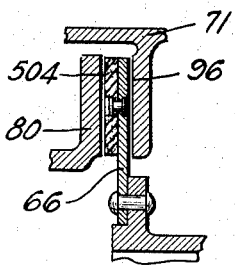
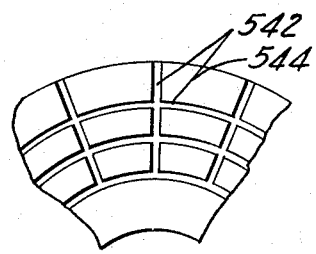
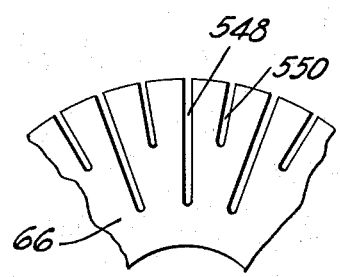
FIG.18  FIG.24  FIG.26
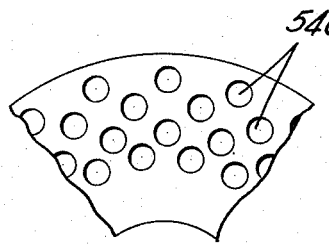
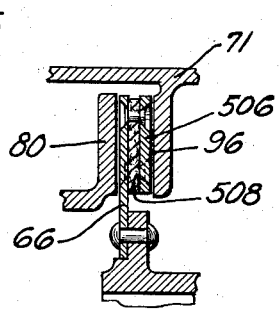
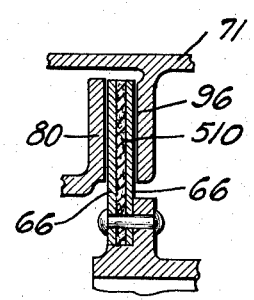
FIG.25  FIG.19  FIG.20
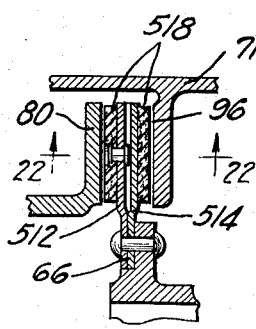
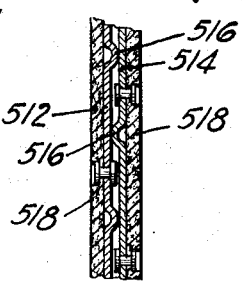
FIG.21  FIG.22
INVENTOR.
LUDGER E. LABRIE
BY
ATTORNEY Patented June 27, 1939

2,163,884

UNITED STATES PATENT OFFICE 2,163,884

BRAKE

Ludger E. La Brie, Detroit, Mich., assignor to Bendix Products Corporation, South Bend, Ind., a corporation of Indiana Application July 6, 1936, Serial No. 88,985

10 Claims. (Cl. 188—140)

This invention relates to mechanical servo brakes and more particularly to automotive vehicle brake systems wherein the force for applying the wheel brakes is derived from a friction device adapted to receive torque from some continuously rotating member associated with the vehicle, as for example, the propeller shaft. The torque so derived is transmitted to the brake linkage for applying the wheel brakes.

This particular invention relates to improvements in the frictional device for obtaining the brake operating force, one feature being in combining such a device with the well known transmission brake wherein additional safety results since the friction device may not only act as a device for deriving a brake operating force for applying wheel brakes, but may also act as a positive brake itself in the event of a failure in the other system.

Another feature of the invention relates to various improved mechanisms for transforming torque of either rotational direction into uniform brake operating force.

Still another feature of the invention has to do with various friction disc and lining structures, and also the arrangement and choice of linings so that different coefficients of friction may be obtained on the opposite faces of friction discs so that desired ratios between the transmission braking effect and derived brake operating torque for operating the wheel brakes can be obtained.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views.

Figure 2:
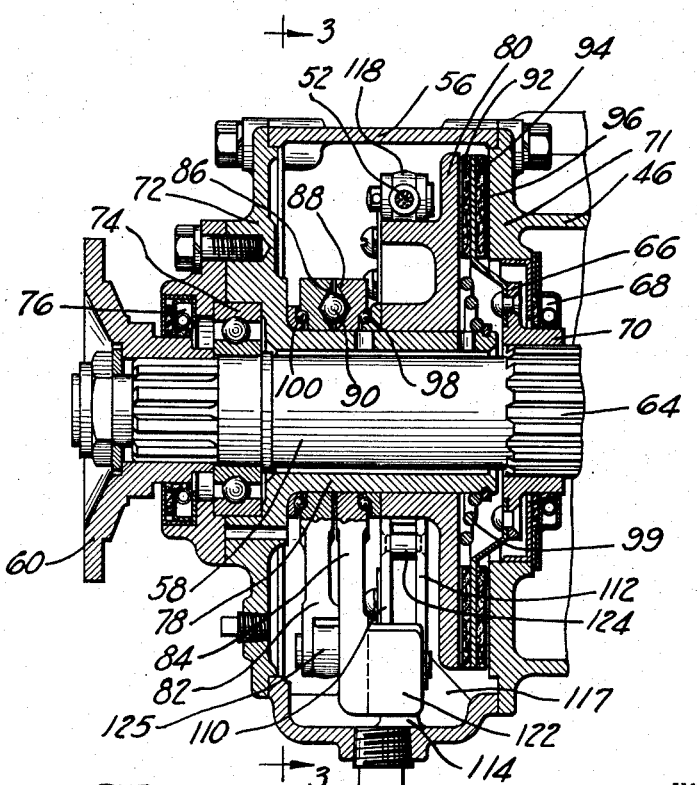
Fig. 2 is a longitudinal vertical section through the friction device for deriving torque for wheel brake operation.
Figure 4:
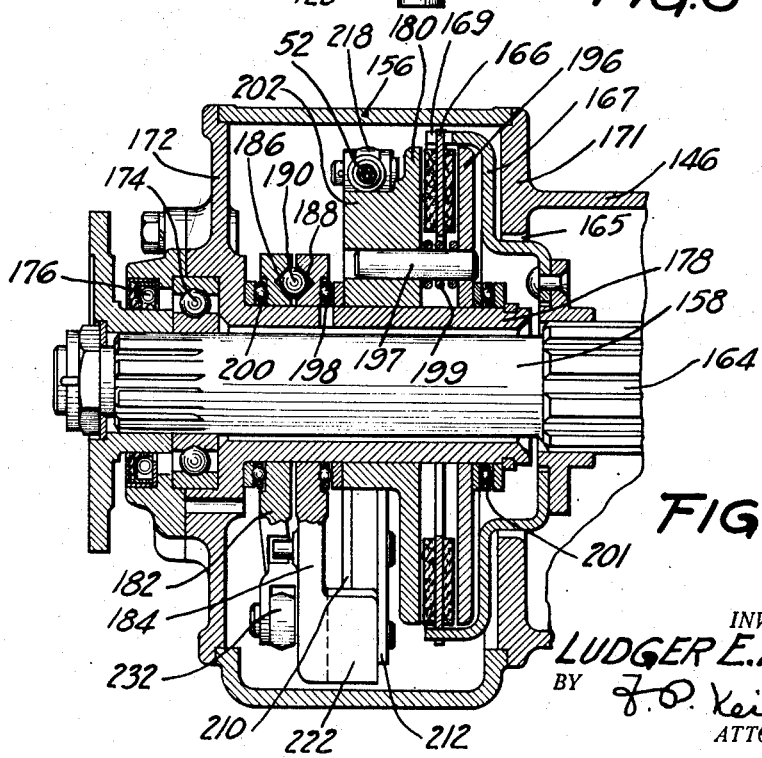
Fig. 4 is a longitudinal vertical section through a slightly modified structure also for deriving torque for operating the brakes.
Figure 15:
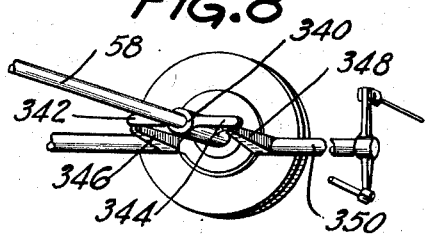

Figs. 7, 8, 9, 10, 11, 12, 13, and 14 are other diagrammatic end views of an alternative linkage for use in the modifications of Figs. 2 and 4;

Fig. 15 is also a modified form applicable to the structures in Figs. 2 and 4, the same being applied directly to the wheel brake cross shaft;

Fig. 16 illustrates a method of applying friction lining to the rotating disc of Figs. 2 and 4;

Fig. 17 illustrates the application of a different form of lining to the rotating disc of Figs. 2 and 4;

Figs. 18, 19, 20 and 21 illustrate other modified forms of Figs. 16 and 17;

Fig. 22 illustrates a section through the disc of Fig. 21 taken on the rivet circle 22—22 and passing through the lining;

Figs. 23, 24 and 25 show various methods of grooving friction lining in order to assist in providing smooth engagement and friction characteristics, and Fig. 26 illustrates a friction disc and radial slots to permit expansion without buckling.

Figure 1:
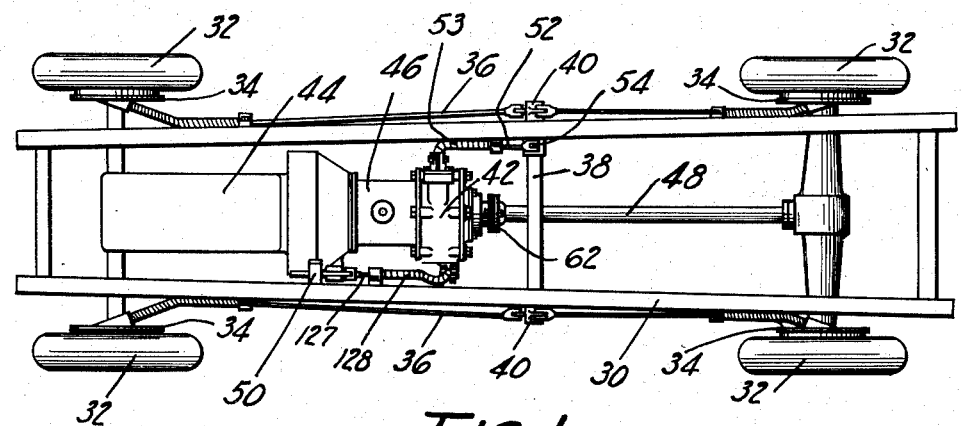
Fig. 1 is a top plan view of a vehicle chassis showing the application of the mechanical servo brake to the usual transmission housing.

Referring to Fig. 1 of the drawings, there is shown a motor vehicle chassis having a frame 30 with wheels 32 provided with wheel brakes 34. The wheel brakes 34 are connected by linkages 36 to a cross shaft 38 through the usual system of levers 40, the cross shaft being adapted for operation by a torque converter 42 more particularly the subject matter of this invention. The chassis also has therein the usual engine 44, transmission or gear reduction device 46 which drives a propeller shaft 48, the latter being constantly in gear with the rear wheels 32 illustrated at the right of Fig. 1. The brake pedal 50 is adapted to control the operation of the torque converter 42 and cause the operation of brakes by tension on the cable 52 and lever 54, the latter being on the cross shaft 38.

Figure 3:
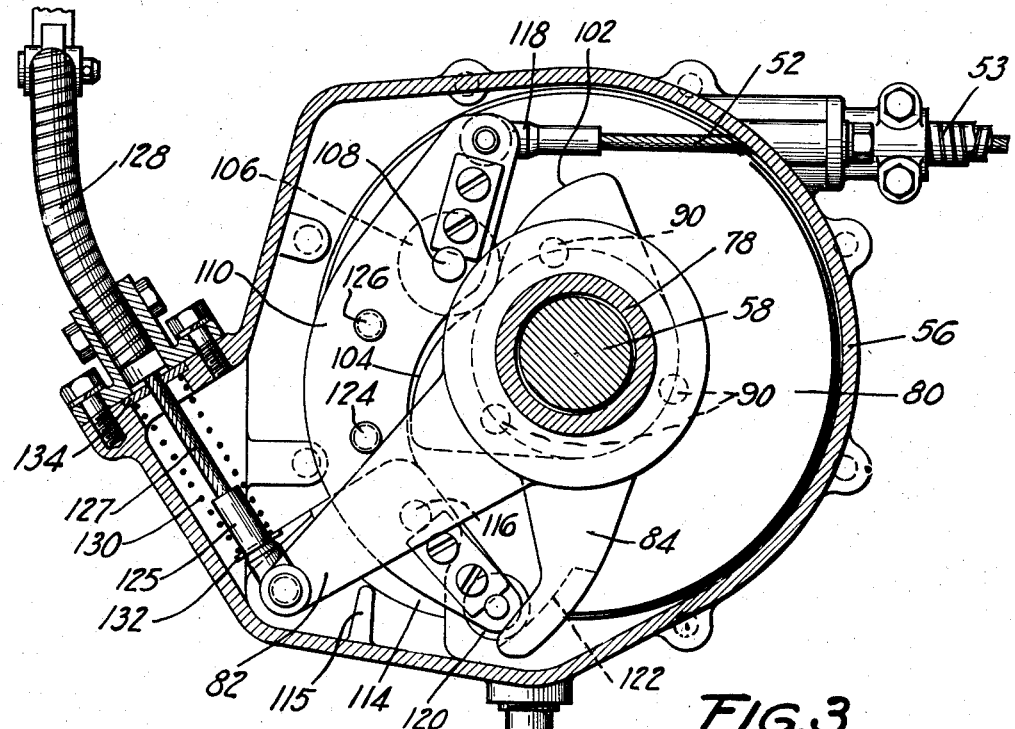
Fig. 3 is an end view of the internal parts of Fig. 2, the casing of Fig. 2 being cut away on the line 3—3.

Referring to Figs. 2 and 3, which show in detail the internal structure of the torque converter, there is shown a housing 56 secured to the rear of the transmission casing 46 and enclosing therein a shaft extension 58 extending out from the transmission casing 46 and being adapted to be permanently coupled to the propeller shaft 48 through a flange 60 and the usual universal joint 62. The shaft 58 is splined at 64 and carries thereon an axially movable and rotatable friction disc 66. An oil seal 68 in engagement with a hub 70 of the splined friction disc and the rear wall 71 of the transmission casing 46 is provided in order to retain the lubricant in the transmission.

The housing 56 is provided with a back plate 72 which carries a tail bearing 74 for the shaft 58 and also an oil seal 76. There is also provided an inwardly or forwardly-extending support sleeve 78 illustrated as integral with the back plate 72 and surrounding the shaft 58, upon which is rotatably supported an axially movable, but relatively stationary friction disc 80. By means of a pair of levers 82 and 84, also pivoted on the sleeve 78, which levers are provided with spaced adjacent pairs of conical recesses 86 and 88 in which lie thrust balls 90, the friction plate or disc 80 may be moved axially into engagement with the lining 92 on the friction disc 66. Further axial movement will slide the friction disc 66 and engage the lining 94 with a smooth annular braking surface 96 provided on the rear face of the back wall 71 of the transmission casing 46. Such axial movement results from the rotation of one lever 82 relative to the lever 84 whereby the balls 90 are caused to ride in the conical recesses 86 and 88 to produce a camming or spreading action and the axial movement so produced is transmitted to the friction member 80 through the thrust bearing 98, a thrust bearing 100 also being provided on the other side of levers 82 and 84 to take care of the reaction upon the casing wall 72. A spring 99 resting against a shoulder on the sleeve 78 and the friction disc 80 is provided to cause the same to normally remain out of frictional engagement with the rotary disc 66 and its linings.

The relatively stationary friction disc 80 is provided thereon with a pair of opposed cam surfaces 102 and 104 which engage a roller 106 pivoted at 108 between a pair of spaced plate levers 110 and 112, the levers being fulcrumed upon a tongue 114 extending between the lever plates, a pin 116 passing through the levers and the tongue for this purpose. Secured between the lever plates at the upper end is a cable eye 118 which is swaged or otherwise secured to the cable 52 which passes through the housing and flexible conduit 53 to the brake cross shaft lever 54 heretofore described. Between the lever plates 110 and 112 at the lower end and on the other side of the fulcrum 116 is provided a roller 120 which is adapted to engage a broad cam surface 122 carried by the lever 84. The lever plates 110 and 112 are otherwise secured together in spaced relation by suitable shouldered double-ended rivets 124 and 126 so that the space plates form a rigid structure. The tongue 114 which carries the fulcrum pin 116 is preferably an integral part of the casing 56 and is provided with bracing webs 115 and 117.

The lever 82 is connected at its extreme end by means of a clevis 124 to a cable 127 extending outward through the casing wall through the conduit 128 to the brake pedal 50. A spring 130 tensioned between a shoulder 132 on the clevis and a washer 134 seated in the housing is adapted to cause the lever 82 to normally take a release position.

Referring to the modification of Fig. 4, it will be observed that the general structure thereof corresponds, to a large extent, with that illustrated in Figs. 2 and 3. The transmission shaft 158 extends outwardly from the transmission through an aperture 165 in the rear wall 171 of the transmission casing 146. A spline 164 slidably carries thereon a spider 167 carrying a rotatable friction disc 166 by means of interengaging teeth 169. The housing 156 is provided with a back plate 172 having a tail bearing 174 for the shaft 158 and also a grease retainer 176. Also integrally carried by the back plate 172 is an inwardly-extending sleeve 178 which surrounds the shaft 158, and on which are mounted a pair of relatively stationary friction discs 180 and 196 and operating levers 182 and 184.

As in Fig. 2, the operating levers are provided with spaced conical recesses 186 and 188 in their adjacent faces in which are positioned thrust balls 190. The friction discs 180 and 196 are pinned together to prevent relative rotation by a pin 197 and on which are positioned springs 199 which are adapted to normally space the discs 180 and 196 apart and out of engagement with the friction lining carried by the disc 166. Thrust bearings 198, 200 and 201 are adapted to transmit the spreading action of the levers caused by relative rotation of the levers 182 and 184 to the discs 180 and 196 to cause the same to engage the friction lining on disc 166. As in Figs. 2 and 3, the friction disc 180 may be provided with a cam 202 which is double in the same manner as illustrated in Fig. 3 and which may engage a roller such as 106 in Fig. 3 carried between spaced lever plates illustrated at 210 and 212. The spaced lever plates are fulcrumed in the same manner as illustrated in Figs. 2 and 3 and carry at their lower end a roller adapted to engage an extended cam surface 222 on the end of the lever 184 and at the upper end a cable eye fitting 218 to which is secured the operating cable 52. The lever 182, also as in Fig. 3, is provided with a connection to the operating cable 127 through a cable fitting illustrated at 232.

The modifications of Figs. 2, 3 and 4 are largely similar in that tension on the cable 127 will rock the lever 82 or 182 causing relative rotation between that lever and the adjacent lever 84 and 184, thus causing the thrust balls 90 and 190 to spread the levers apart and force the friction disc 80 or 180 into engagement with a rotary friction disc 66 or 166. Frictional engagement of the discs tends to rotate the friction disc 80 in Fig. 2 and the friction discs 180 and 196 in Fig. 4 so that the cams 102 and 104 carried thereby tend to rotate forcing the roller 106 to the left and rocking the lever composed of plates 110 and 112 or 210 and 212 counterclockwise, tensioning the cable 52 and applying the wheel brakes. In order that the degree of movement of the lever 110 and the cable 52 may be felt in the applying cable 127, rotation of the lever 110 or 210 causes the roller 120 to ride radially inward upon the cam face 122 or 222 so that the lever 84 is permitted to rotate in a clockwise direction in an amount depending upon the degree of application of the wheel brakes through the cable 52. Rotation of the lever 84 or 184 tends to release the spreading action caused by the relative rotation of lever 82 relative to lever 84 and causes the operator to tension the cable 127 further to maintain the desired tension thereon so that as the brake is applied the lever 84 or 184 constitutes a follow up mechanism with relation to the applying lever 82 or 182.

In the modification of Fig. 2 where the friction disc 80 forces the rotatable friction disc 66 into engagement with the rear casing wall at the point 96, there is provided, in addition to a torque producing device for applying wheel brakes, what is known as a transmission brake, that is, the engagement of the friction lining 94 with a friction surface 96 provides in itself a certain amount of braking action upon the propeller shaft which might act either in conjunction with wheel brakes or as an emergency brake in the event of failure, for example, of the wheel brake linkage. In this particular form the friction linings placed on either side of the friction disc 66 may be varied to produce the desired characteristics, for example, the friction lining 92 might have a coefficient of .2 whereas the lining 94 might have a higher coefficient or the situation reversed depending upon the degree of servo action desired in relation to the amount of transmission braking desired.

Figure 5:
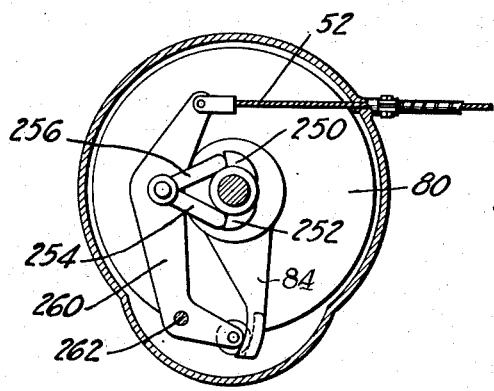
Fig. 5 is a diagrammatic end view of an alternative linkage for use in the modifications of Figs. 2 and 4.
Figure 6:
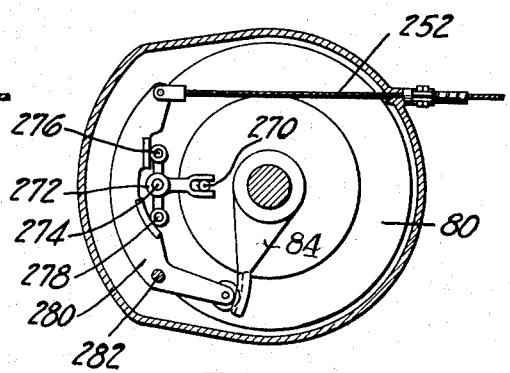
Fig. 6 is another diagrammatic end view of an alternative linkage for use in the modifications of Figs. 2 and 4.
Figure 7:
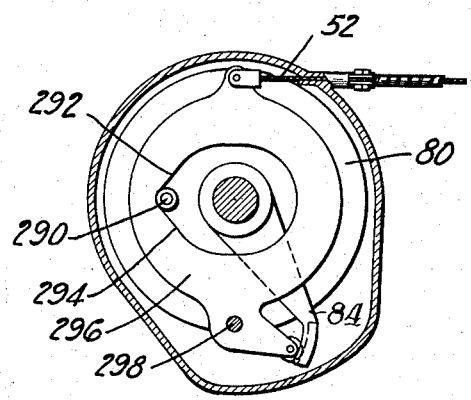
Figure 8:
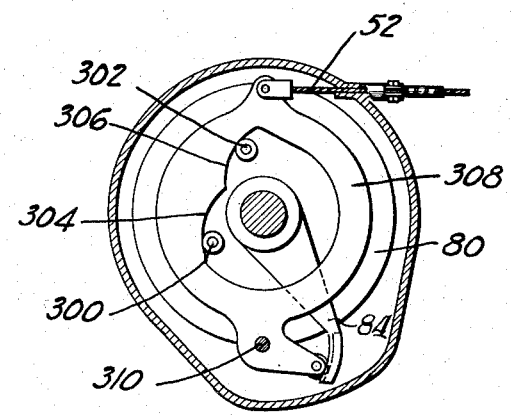

In Figs. 5 through 15 are illustrated a number of forms or mechanisms for transferring the torque derived in the relatively stationary rockable friction disc 80, to the brake operating cable 52 regardless of rotation direction. In Fig. 5, for example, the friction disc 80 of Fig. 2 may rotate a pair of radial shoulders 250, 252 which, depending upon rotation direction, may transmit thrust through struts 254 and 256 to the lever 260 pivoted at 262 thereby tensioning the cable 52 to apply the wheel brakes. In Fig. 6, the friction disc 80 may carry an eccentric pin 270 operable in a bifurcated end of a T-shaped lever 272. The lever is pivoted at 274 and the opposite ends 276 and 278 of the cross bar of the T are adapted to engage cam surfaces upon a lever 280 fulcrumed at 282 and adapted to tension the cable 252. In Fig. 7, an eccentric pin and roller 290 is shown as carried by the friction disc 80 of Fig. 2 which pin engages cam surfaces 292 and 294 on an apertured lever 296 fulcrumed at 298 so that cable 52 is tensioned upon movement of the pin 290 in either direction. In Fig. 8 a structure similar to Fig. 7 is shown including a pair of eccentric pins and rollers 300 and 302 carried by the rockable friction disc 80. The pin rollers engage cam surfaces 304 and 306 on the lever 308 fulcrumed at 310, thus being adapted to tension the cable 52.

In the modification of Fig. 15 the rotatable friction disc 80 may be provided with a sleeve 340 extending outside the housing between the support sleeve 78 and the outer shaft 58 and there be provided with oppositely-extending levers 342 and 344, the said levers being adapted to engage cooperating levers 346 and 348 on a transversely-extending cross shaft 350 so that by rotation of the sleeve 340 in either direction, unidirectional rotation of the cross shaft 350 is produced. If desired, by merely lengthening the housing the cross shaft 350 could be passed through the housing and the levers 346 and 348 and 342 and 344 located therewithin.

Figure 9:
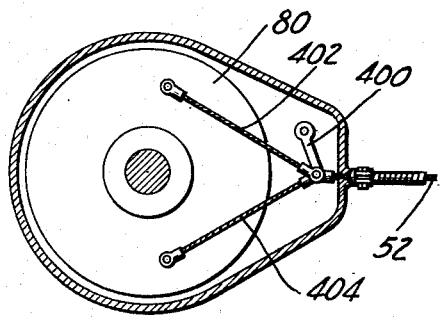
Figure 10:
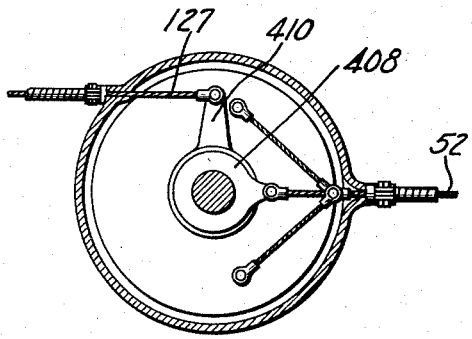

In Fig. 9 there is illustrated a simple method of obtaining one-way movement of a brake operating cable 52 for either forward or reverse rotation of the friction disc 80. For this purpose, the end of the cable 52 is pivoted on a freely rocking lever 400 and connected to the disc 80 by means of two flexible tension cables 402 and 404, one of which may buckle when the other is tensioned. Fig. 10 is a form of Fig. 9 slightly modified in that a third cable is connected to a lever 408 corresponding to the lever 84 of Fig. 2 so that upon movement of the cable 52 to the left the lever 408 may rotate and follow up the movement of the applying lever 410 which corresponds to the applying lever 82 of Fig. 2.

Figure 11:
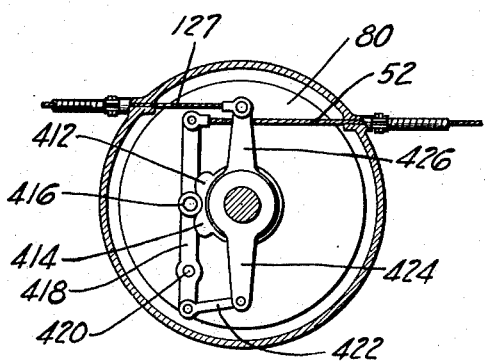
Figure 12:
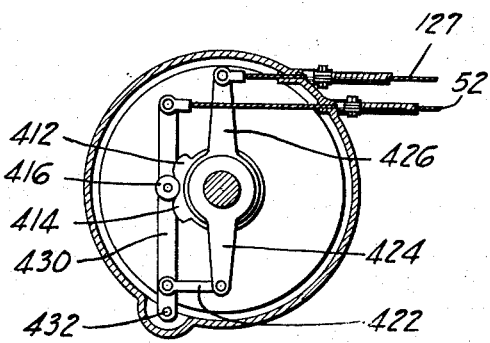

In Fig. 11 the friction disc 80 carries a double cam 412 and 414 which engages a roller 416 on a lever 418 fulcrumed at 420. The upper end of the lever is connected to the tension cable 52 to operate the wheel brake linkage and the lower end is connected by a link 422 to a follow up lever 424 corresponding to lever 84 of Fig. 2 so that the movement of the applying lever 426, which corresponds to lever 82, is followed by the lever 424. In Fig. 12, Fig. 11 is modified in that the lever 430 is fulcrumed at the lower end at 432 so as to rock the follow up lever 424 in the opposite direction so that the cable 127 may extend in the opposite direction.

Figure 13:
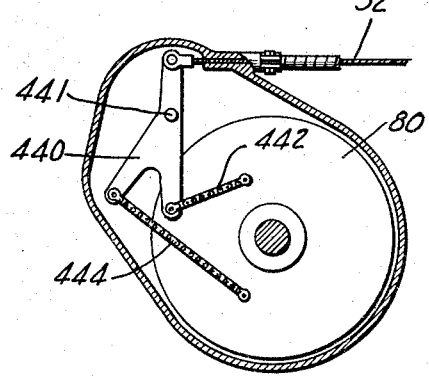
Figure 14:
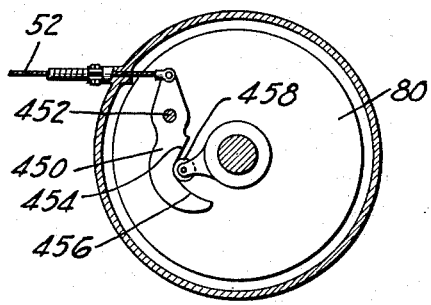

In Fig. 13, a bell crank lever 440 fulcrumed at 441 is provided having flexible tension connections 442 and 444 to the friction disc 80 so that rotation in either direction will tension the brake applying cable 52. In Fig. 14 there is illustrated a lever 450 fulcrumed at 452 and having cam surfaces 454 and 456 adapted to engage an eccentric roller 458 carried by the friction disc 80, the lever being adapted to tension cable 52.

In all the above modifications there is provided means for producing a unidirectional tension in a cable, regardless of the rotation direction of the friction disc from which torque is derived. It will appear obvious that where double cam surfaces are provided, the contour of one of the cam surfaces may be varied with respect to the other so that its position, though farther from the fulcrum of the lever upon which it is carried, will not cause a different displacement of the lever merely because there is a different direction of rotation of the friction disc 80. It will, of course, be understood that should a different applying ratio be desired during backing of the car or one direction of rotation of friction disc 80, that the cam surfaces of the sort illustrated in Figs. 6, 7, 8 and 12 may be varied to suit the requirements. Likewise, in the devices employing flexible tension elements such as 9, 10 and 13, the location of the point at which one tension element is secured to the friction disc 80 relative to the other may be varied to produce unequal action in forward and reverse or to suit requirements.

In Figs. 16, 17, 18, 19, 20, 21 and 22 are shown various methods of applying friction lining to the rotating friction disc 66. In Fig. 16, lining is applied to either side, one lining being adapted to engage the slightly rotatable friction disc 80 and the other being adapted to engage a stationary friction surface referred to in Fig. 1 as 71. As previously described, the friction lining on one side of the disc may be different from that on the other so as to provide different coefficients of friction and different frictional characteristics as between the servo wheel brake applying device and the transmission brake. In Fig. 17, the disc 66 is provided with lining 500 on one side which may engage the annular fixed braking surface 96 and which lining retains headed cork inserts 502 in position in corresponding apertures in the disc 66, the cork inserts being adapted to engage the friction disc 80. Such a structure is particularly well adapted where the mechanism runs in oil. In Fig. 18, the friction disc is adapted to directly engage the braking surface 96 and is provided on its other surface with a friction lining 504 for engagement with the disc 80. In Fig. 19, the friction disc 66 is adapted to directly engage the disc 80 and is provided with a wear plate 506 adapted to engage the braking surface 96. Between the wear plate 506 and disc 66 may be placed a disc cushion 508 which may have heat insulating properties so that if a higher coefficient of friction is employed in connection with the transmission brake, the heat generated may not be transferred readily to the friction disc 80. In Fig. 20, two friction discs 66 are provided with a cushioning element 510 therebetween.

In Figs. 21 and 22 there is illustrated a friction disc 66 made up of two elements 512 and 514 arranged back to back and provided with spacing ribs 516. A lining 518 is secured to each face and the spacing ribs permit the flow of oil or fluid in between the discs 512 and 514 so that increased cooling action may result.

Figs. 23, 24 and 25 illustrate methods of grooving friction lining for friction discs in order to improve the smoothness and controllability of brake operation. In Fig. 23 intersecting spiral grooves 540 are provided for this purpose, which grooves may be easily cut. In Fig. 24 there is shown radial grooves 542 and concentric grooves 544 which likewise may be easily cut. In Fig. 25, a plurality of circular pockets or recesses 546 are provided which may or may not extend through the lining or disc.

In Fig. 26 a method of guarding against possible buckling of the supporting friction disc 66 is illustrated since the outer edge of the disc due to a higher speed of rubbing developes higher temperatures than the inner section and also since the inner periphery is used for attaching means and is maintained at a lower temperature, thus producing thermo stresses. For this purpose, the disc may be radially slitted as at 548 and 550 so that expansion of the outer periphery may take place.

It will appear obvious that any of the above friction disc arrangements may be employed in the modification shown in Figs. 2 or 4 and that the modifications of Figs. 2 and 4 may be varied so as to employ any one of the devices illustrated diagrammatically in Figs. 5 through 15. It will also appear that the structures herein disclosed form an extremely simple and reliable mechanism adapted to employ the movement of a vehicle to apply brakes so that little physical effort on the brake pedal is required for brake application.

There has been thus described two embodiments of a mechanical servo power brake, one of which is peculiarly adapted to act as transmission brake as well, together with a number of alternative structures which may be incorporated or substituted for the corresponding parts illustrated in the modifications of Figs. 2 and 4. The structures illustrated are readily adapted for installation on a common automotive vehicle without the necessity of redesigning or reorganizing the parts other than the possible slight extension of the transmission driven shaft and movement of the universal joint rearwardly a slight amount.

Although two embodiments of the invention, together with numerous alternative structures have been illustrated and described, it is to be understood that the invention is not to be limited thereto but may be employed in other equivalent mechanical arrangements and forms, for example, the various features of any one of the modifications might be substituted for those of other modifications. As such and other changes in construction and arrangement may be made without departing from the spirit of the invention as will be apparent to those skilled in the art, reference will be had to the appended claims for a definition of the limits of the invention.

What is claimed is:

1. In a mechanical servo power brake, a wheel brake operating linkage, an automative vehicle transmission housing having a drive shaft extending from the rear thereof, a fixed friction face on the rear surface of said transmission housing, a friction member rotatable with said drive shaft and adapted to engage said face, an axially movable friction plate adapted to engage said friction member and cause the same to engage said face, and means for transmitting torque derived from said plate to said linkage.

2. In a mechanical servo power brake, a wheel brake operating linkage, an automotive vehicle transmission housing having a drive shaft extending from the rear thereof, a fixed friction face on the rear surface of said transmission housing, a friction member rotatable with said drive shaft and adapted to engage said face, an axially movable friction plate adapted to engage said friction member and cause the same to engage said face, means for transmitting torque derived from said plate to said linkage, and means for thrusting said plate into engagement with said disc.

3. In a mechanical servo brake, a rotating disc, a rotatable plate axially movable into frictional engagement with said disc, an operating lever, a follow up lever and means for spreading the levers to move said plate into engagement with said disc upon relative rotation of the levers, an actuating lever, cam and follower means for moving said actuating lever in response to rotation of said plate, and said follow up lever being movable in response to movement of said actuating lever.

4. In a mechanical servo brake, a rotating disc, a rotatable plate axially movable into frictional engagement with said disc, an operating lever, a follow up lever and means for spreading the levers to move said plate into engagement with said disc upon relative rotation of the levers, an actuating lever, cam and follower means for moving said actuating lever in response to rotation in either direction of said plate, and said follow up lever being movable proportionally in response to movement of said actuating lever.

5. In a mechanical servo brake, a torque plate, a cam carried thereby, a housing, a lever comprising spaced plates and pivoted on a tongue inserted therebetween, a roller pivoted between the plates and rolling on said cam, and brake operating linkage connected to a fitting pivoted between the plates, near one end thereof.

6. In a mechanical servo brake, a rotating disc, a torque plate frictionally engageable therewith, a cam carried thereby, a housing, a lever comprising spaced plates fulcrumed on a tongue inserted therebetween and fixed to the housing, a roller between said plates for engaging said cam, a pair of levers adapted upon relative rotation to engage said disc and plate, and a cam on one of said pair of levers, and a second roller between said spaced plates engaging said lever cam.

7. In a mechanical servo brake, a rotatable friction disc, a fixed disc, an axially movable and slightly rotatable friction plate, means for applying wheel brakes from torque produced in said plate, and means for frictionally engaging said discs and plate to positively brake said rotatable friction disc and simultaneously produce torque in said plate.

8. In a mechanical servo brake, a shaft, a support sleeve therearound, a friction disc splined to said shaft, a friction plate slidably and pivotally mounted on said sleeve for engagement with said disc, a pair of levers pivotally mounted on said sleeve having pairs of complementary conical recesses in their adjacent faces, and a roller in each pair, and means for rotating one of said levers to spread them apart and move said plate into engagement with said disc, the other of said levers being rotatable in one direction upon rotation of said plate in either direction.

9. In a mechanical servo brake, a shaft, a support sleeve therearound, a friction disc splined to said shaft, a friction plate slidably and pivotally mounted on said sleeve for engagement with said disc, a pair of levers pivotally mounted on said sleeve having pairs of complementary conical recesses in their adjacent faces, and a roller in each pair, means for rotating one of said levers to spread them apart and move said plate into engagement with said disc, the other of said levers being rotatable in one direction upon rotation of said plate in either direction, and means associated with said last named means for applying wheel brakes.

10. In a mechanical servo brake, a rotatable disc, a torque plate, means including a pair of levers for engaging said plate with said disc on relative rotation of said levers, a flexible brake actuating cable connected to one of said levers and normally extending radially therefrom, and a pair of flexible cables connecting said actuating cable with points on said plate diametrically opposed to one another, whereby rotation of the other lever will cause said brake actuating cable at its connected end to the one of said levers to slacken, permitting the one of said levers to follow the movement of the other.

LUDGER E. LA BRIE.